US009414414B2

(12) United States Patent
Deng et al.

(10) Patent No.: US 9,414,414 B2
(45) Date of Patent: Aug. 9, 2016

(54) METHOD AND DEVICE FOR ESTABLISHING SELECTED IP TRAFFIC OFFLOAD CONNECTION UNDER H(E)NB

(75) Inventors: Qiang Deng, Beijing (CN); Juan Zhang, Beijing (CN); Yanfei Zhou, Beijing (CN)

(73) Assignee: DATANG MOBILE COMMUNICATIONS EQUIPMENT CO., LTD, Beijing (CN)

( * ) Notice: Subject to any disclaimer, the term of this patent is extended or adjusted under 35 U.S.C. 154(b) by 247 days.

(21) Appl. No.: 13/985,872

(22) PCT Filed: Feb. 17, 2012

(86) PCT No.: PCT/CN2012/071249
§ 371 (c)(1),
(2), (4) Date: Aug. 15, 2013

(87) PCT Pub. No.: WO2012/110000
PCT Pub. Date: Aug. 23, 2012

(65) Prior Publication Data
US 2013/0322240 A1 Dec. 5, 2013

(30) Foreign Application Priority Data
Feb. 17, 2011 (CN) .......................... 2011 1 0039751

(51) Int. Cl.
*H04L 12/801* (2013.01)
*H04L 12/54* (2013.01)
*H04L 12/851* (2013.01)
*H04L 12/701* (2013.01)
*H04W 80/04* (2009.01)
*H04W 88/06* (2009.01)
(Continued)

(52) U.S. Cl.
CPC .............. *H04W 76/02* (2013.01); *H04W 8/082* (2013.01)

(58) Field of Classification Search
CPC . H04L 47/10; H04L 12/5695; H04L 47/2441; H04L 45/00; H04W 80/04; H04W 88/06
USPC ............... 370/230, 230.1, 231, 235, 237, 328
See application file for complete search history.

(56) References Cited

U.S. PATENT DOCUMENTS

| 2010/0080186 A1* | 4/2010 | Guo et al. ...................... 370/329 |
| 2010/0272013 A1* | 10/2010 | Horn et al. ...................... 370/328 |

(Continued)

FOREIGN PATENT DOCUMENTS

| CN | 101202702 A | 6/2008 |
| CN | 101945429 A | 1/2011 |

(Continued)

OTHER PUBLICATIONS

International Search Report for PCT/CN2012/071249.

*Primary Examiner* — Ronald B Abelson
(74) *Attorney, Agent, or Firm* — Kilpatrick Townsend & Stockton LLP

(57) ABSTRACT

Provided is a method for establishing a selected IP traffic offload connection under an H(e)NB, including: obtaining a packet data network connection request of a certain access point; obtaining the address of a local gateway connected with the H(e)NB and information about the access points supported by the local gateway; judging whether or not the requested access point allows the establishment of a selected IP traffic offload connection; judging whether or not the local gateway is able to connect to the requested access point; determining a method for establishing a selected IP traffic offload connection according to the judgment result and establishing a selected IP traffic offload connection. According to the method for establishing a selected IP traffic offload connection under an H(e)NB scenario in the present invention, judgment can be done before a connection is established, so that the waste of signalling resources caused by reconnection after connection failure is avoided. Also provided is a device for establishing a selected IP traffic offload connection under an H(e)NB.

16 Claims, 5 Drawing Sheets

(51) Int. Cl.
  *H04W 76/02*   (2009.01)
  *H04W 8/08*    (2009.01)

(56)     References Cited

U.S. PATENT DOCUMENTS

| | | | | |
|---|---|---|---|---|
| 2011/0045826 | A1* | 2/2011 | Kim | H04W 8/082 455/426.1 |
| 2012/0076121 | A1* | 3/2012 | Choi et al. | 370/338 |
| 2012/0134319 | A1* | 5/2012 | Kahn | H04W 8/26 370/328 |

FOREIGN PATENT DOCUMENTS

| | | |
|---|---|---|
| CN | 102158905 A | 8/2011 |
| WO | 2010123643 A1 | 10/2010 |
| WO | 2010126326 A2 | 11/2010 |

\* cited by examiner

METHOD AND DEVICE FOR ESTABLISHING SELECTED IP TRAFFIC OFFLOAD CONNECTION UNDER H(E)NB

The present application is a U.S. National Stage of International Application No. PCT/CN2012/071249, filed 17 Feb. 2012, designating the United States, and claiming priority to Chinese Patent Application No. 201110037545.6, filed with the State Intellectual Property Office of China on Feb. 17, 2011 and entitled "Method and device for establishing selected IP traffic offload connection under H(e)NB", which is hereby incorporated by reference in its entirety.

FIELD OF THE INVENTION

The present invention relates to the field of mobile communication radio access technologies and particularly to a method and device for establishing a data connection under an H(e)NB.

BACKGROUND OF THE INVENTION

Along with the development of radio access technologies, data transmission is transported at an increased rate, and both an increased number of subscribers and an improved transmission rate of subscriber data increasingly demand for the performance of network elements of a core network. Particularly, the Selected IP Traffic Offload (SIPTO) technology refers to technology to allow the core network to select for a User Equipment (UE) a gateway at the shortest distance from an attachment point of the UE thereby have a part of data flows of the UE enter a Packet Data Network (PDN) directly through the gateway. Since the selected IP traffic offload technology can offload a specific IP service through the gateway at the shortest distance from the attachment point of the UE to thereby save transmission resources of the core network, this technology is highly regarded by an increasing number of those skilled in the art.

An existing macro eNB-based selected IP traffic offload architecture is generally embodied as an existing LTE system architecture in which a PDN Gateway (P-GW) at the shortest distance from the geographical location of an attachment point of a UE is selected as an offload point, and all of data flows intended for a packet data network to be subjected to a selected IP traffic offload strategy are transported through the packet data network gateway without influencing normal core network traffic. The selected IP traffic offload is activated in the course of establishing a connection of the packet data network, and particularly a core network control node, i.e., a Mobility Management Entity (MME), determines from subscription data and an operator configuration whether the selected IP traffic offload can be activated. Moreover, in the macro eNB-based selected IP traffic offload architecture, a macro eNB can also perform the selected IP traffic offload through a Local Gateway (L-GW), that is, the selected IP traffic enters a local home or enterprise network through the local gateway.

Along with the development of technologies, it is desirable to have the selected IP traffic offload architecture also applicable to a Home (enhanced) NodeB (H(e)NB), so that selected IP traffic offloaded traffic enters the local home or enterprise network through a direct tunnel between the H(e)NB and a local gateway. When the UE requests through the H(e)NB a connection of the data packet network to be established, a local gateway associated with the H(e)NB is selected for the UE as its packet data network gateway if the selected IP traffic offload is allowed to be activated in the network.

A selected IP traffic offload connection is established in the scenario of an H(e)NB typically in such a way that the H(e)NB reports an address of a local gateway to a core network control node and the core network control node establishes a selected IP traffic offload connection for the UE directly with the reported address of the local gateway.

The H(e)NB can be arranged integrally to or separately from the local gateway. In an existing solution, when the H(e)NB is arranged integrally to the local gateway, the H(e)NB reports the address of the local gateway to the core network control node which in turn can establish a selected IP traffic offload connection for the UE directly with the address of the local gateway. On the contrary, when the H(e)NB is arranged separately from the local gateway, the core network control node has to obtain the address of the local gateway for a selected IP traffic offload connection through a Domain Name System (DNS). Since there are a large number of local gateways in a scenario with deployment of an H(e)NB, a considerable query burden may arise from inquiring the domain name system for the address of the local gateway.

In a subsequent improved solution, the H(e)NB shall report the address of a local gateway to the core network control node which in turn establishes a selected IP traffic offload connection regardless of whether the H(e)NB is arranged integrally to or separately from the local gateway. However, the local gateway may fail to connect to a requested access point because the selected IP traffic offload connection is established simply through Access Point Name (APN)-based access control.

Consequently in such a solution, when the core network control node establishes a selected IP traffic offload connection for the UE with the reported address of the local gateway, the local gateway will return information of a connection establishment failure if the local gateway fails to connect to the packet data network requested by the UE, resulting in a failure to establish a selected IP traffic offload connection and a consequential waste of signalling resource.

SUMMARY OF THE INVENTION

The embodiments of the invention provides a method and device for establishing a selected IP traffic offload connection under a H(e)NB so as to avoid a waste of a signalling resource arising from retrying a connection upon failure to establish a selected IP traffic offload connection.

In order to address the foregoing problem, an embodiment of the invention discloses a method for establishing a selected IP traffic offload connection under a H(e)NB, which includes:

obtaining a request for a packet data network connection to an access point name (APN);

obtaining an address of a local gateway in connection with the H(e)NB and information of APNs supported by the local gateway;

determining whether the APN allows a selected IP traffic offload connection to be established;

determining whether the local gateway is capable of being connected to the APN; and determining from determination results a scheme for establishing a selected IP traffic offload connection, and establishing a selected IP traffic offload connection.

An embodiment of the invention further discloses a device for establishing a selected IP traffic offload connection under a H(e)NB, which includes:

a connection request obtaining module configured to obtain a request for a packet data network connection to an access point name (APN);

a local gateway information obtaining module configured to obtain an address of a local gateway in connection with the H(e)NB and information of APNs supported by the local gateway;

a first determining module configured to determine whether the requested APN allows a selected IP traffic offload connection to be established;

a second determining module configured to determine whether the local gateway is capable of being connected to the requested APN; and a connecting module configured to establish a selected IP traffic offload connection.

Furthermore, the device further includes:

a third determining module configured to determine whether the H(e)NB is in connection with the local gateway; and a local gateway information sending module configured to send the information of the local gateway to the local gateway information obtaining module.

The invention has the following advantages over the prior art.

In the method and device for establishing a selected IP traffic offload connection under a H(e)NB according to the embodiments of the invention, the H(e)NB sends the initial UE message to the core network control node by adding thereto the address of a local gateway and the names of APNs supported by the local gateway, and thereafter the core network control node can firstly determine from the message whether the local gateway is capable of being connected to the requested APN before requesting for the connection. When the core network control node determines the requested APN allows a selected IP traffic offload connection to be established but the local gateway is incapable of being connected to the requested APN, no direct tunnel between the H(e)NB and the local gateway can be established. The determination process is performed before establishing the connection, so it is not necessary to return a message of a connection establishment failure, and the core network control node can reselect a serving gateway and a packet data network gateway and establish a selected IP traffic offload connection to thereby avoid a waste of a signalling resource arising from retrying a connection after the message is returned only upon connection failure as in the prior art.

DETAILED DESCRIPTION OF THE EMBODIMENTS

The invention will be further detailed below with reference to the drawings and embodiments thereof so as to make the foregoing objects, features and advantages of the invention become more apparent.

Figure 1:
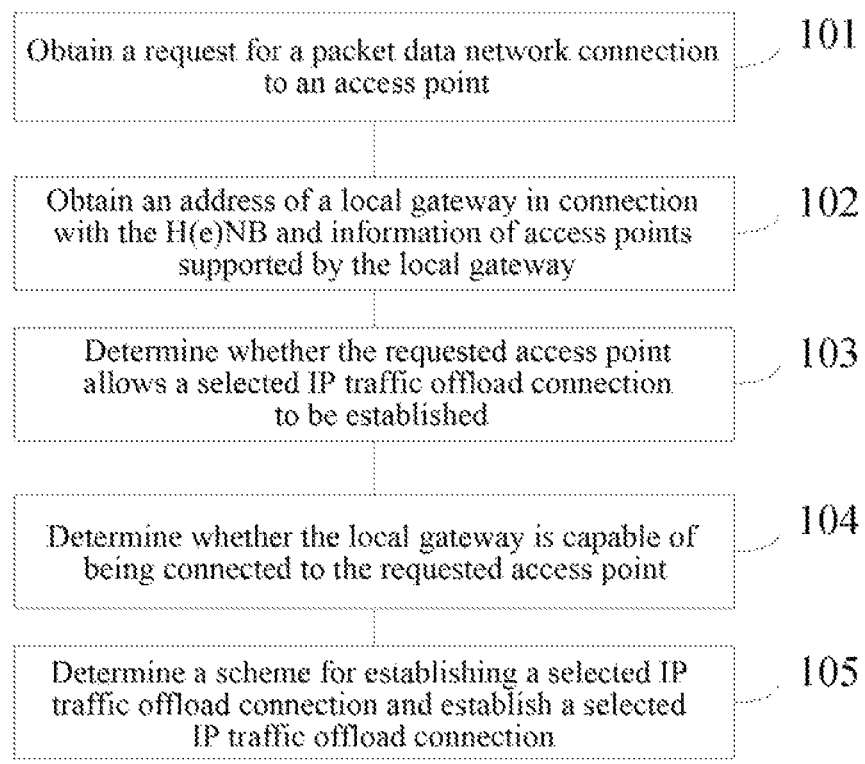
FIG. 1 is a flow chart of a method for establishing a selected IP traffic offload connection under an H(e)NB according to a first embodiment of the invention.

Referring to FIG. 1, there is illustrated a method for establishing a selected IP traffic offload connection in a scenario with an H(e)NB according to a first embodiment of the invention, which includes the following steps.

The step 101 is to obtain a request for a packet data network connection to an APN.

A UE initiates the request for the packet data network connection to the APN, and a core network control node obtains the connection request.

The step 102 is to obtain an address of a local gateway in connection with the H(e)NB and information of APNs supported by the local gateway.

Before the step 102, the method further includes the step 1021 in which the H(e)NB selects a local gateway with an address and information of APNs supported by the local gateway to be reported. The core network control node obtains the information of the local gateway from the information reported by the H(e)NB.

Before a connection is established, the H(e)NB sends the address of the local gateway and the information of APNs supported by the local gateway to the core network control node by appending them into an initial connection request message.

There may be one or more local gateways connected with the H(e)NB. When there is only one local gateway connected with the H(e)NB, then the H(e)NB reports the address of this local gateway and access point names supported by this local gateway. When there are multiple local gateways connected with the H(e)NB, then the H(e)NB can select one of the local gateways randomly and report the address of this local gateway and the access point names supported by this local gateway or can report the addresses of all the local gateways connected therewith and the access point names supported by respective local gateways. Particularly, the H(e)NB reports them by sending the address(es) of the local gateway(s) and the information of the APNs supported by the local gateway(s) to the core network control node in a message.

The step 103 is to determine whether the requested APN allows a selected IP traffic offload connection to be established.

The core network control node determines whether the requested APN allows a selected IP traffic offload connection to be established after obtaining the connection request of the UE, and if so, then it proceeds to the step 104; otherwise, it establishes a packet data network connection through a core network gateway.

The core network control node obtains subscription information from a Home Subscriber Server (HSS) and then obtains local configuration information, and the core network control node can determine from the subscription information and the local configuration information whether the APN requested by the UE allows a selected IP traffic offload connection to be established, and the APN requested by the UE allows the connection to be established only if both the subscription information and the local configuration information indicate that the APN allows to establish the connection; otherwise, it indicates that the connection is disallowed to be established.

The determination can be made from flag bits in the subscription information and the local configuration information obtained by the core network control node, for example, if both flag bits are "1", then it indicates that the APN allows a selected IP traffic offload connection to be established, or if either or both of the flag bits is or are "0", then it indicates that the APN allows no selected IP traffic offload connection to be established.

The step 104 is to determine whether the local gateway is capable of being connected to the requested APN.

The core network control node determines whether the local gateway is capable of being connected to the APN requested by the UE according to the information of the APNs supported by the local gateway reported from the H(e)NB in the step 101. In a determination process, if the APNs supported by the local gateway reported from the H(e)NB include the APN requested by the UE, then it indicates that the local gateway is capable of being connected to the APN requested by the UE; otherwise, it indicates that the local gateway is incapable of being connected to the APN requested by the UE.

The step 105 is to determine from determination results of the step 103 and the step 104 a scheme for establishing a selected IP traffic offload connection and to establish a selected IP traffic offload connection.

If the local gateway is capable of being connected to the APN requested by the UE, then the core network control node establishes a selected IP traffic offload connection of the H(e)NB through the local gateway. If the local gateway is incapable of being connected to the APN requested by the UE, then the core network control node reselects a core network gateway to establish a selected IP traffic offload connection.

If the core network control node determines that the local gateway is capable of being connected to the APN requested by the UE according to the address of the local gateway and the information of the APNs supported by the local gateway, then it indicates that the local gateway allows to establish a selected IP traffic offload connection, and then the core network control node establishes a selected IP traffic offload connection of the H(e)NB through the local gateway. Specifically, the selected IP traffic offload connection through the local gateway can be established by establishing a direct tunnel between the H(e)NB and the local gateway. If the local gateway is incapable of being connected to the APN requested by the UE, then it indicates that the local gateway disallows to establish a selected IP traffic offload connection, and then a serving gateway and a packet data network gateway can be reselected to establish a selected IP traffic offload connection through the serving gateway and the packet data network gateway.

Stated otherwise, in the embodiment of the invention, before a selected IP traffic offload connection is established, it is firstly determined whether the connection can be established through the local gateway, and if so, then it is preferential to be through the local gateway; otherwise, other gateways, e.g., a serving gateway and a packet data network gateway, are reselected to establish the connection. A waste of a signalling resource can be avoided by firstly making determination prior to connecting and adjusting a connection scheme automatically according to a determination result.

Figure 2:
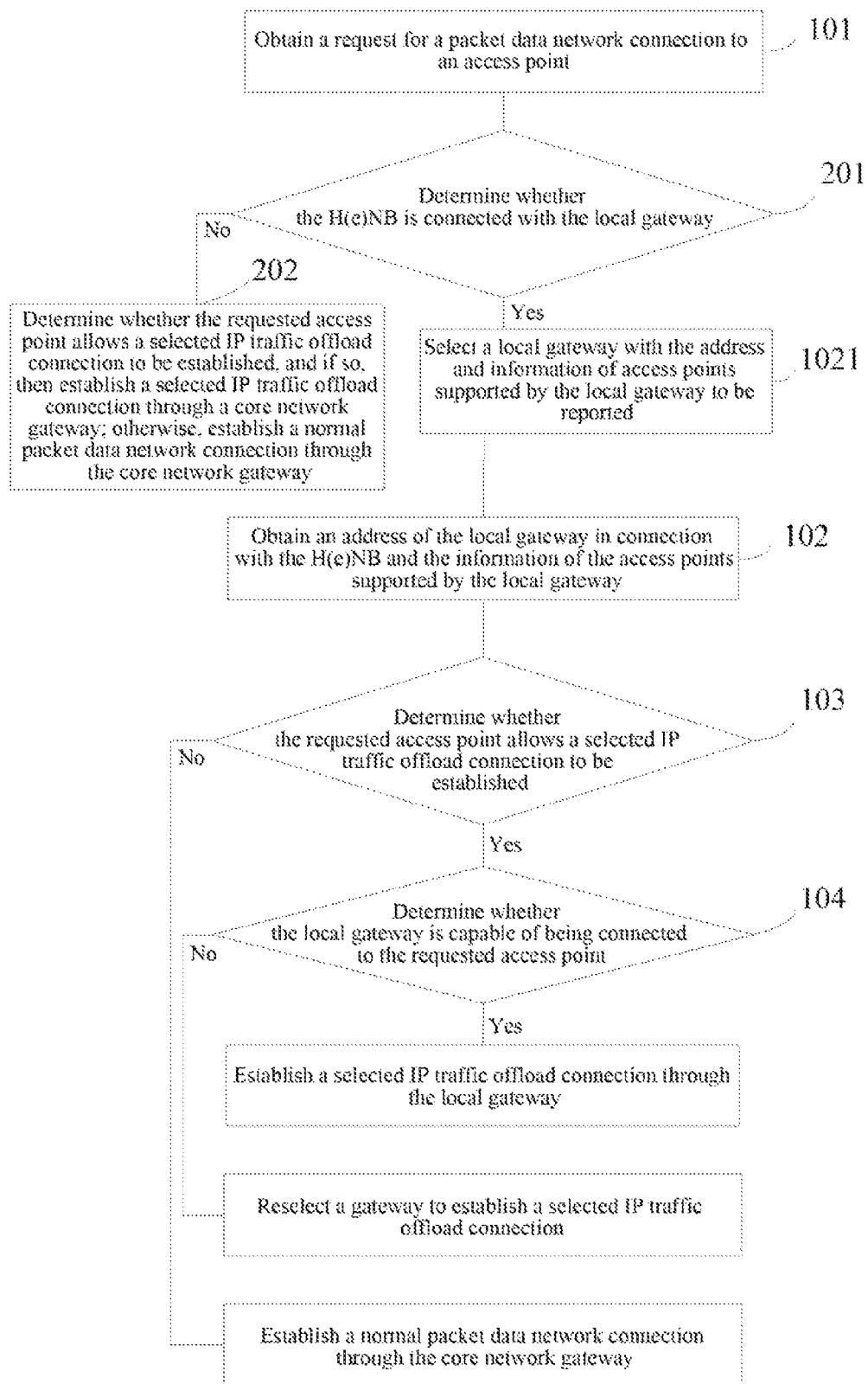
FIG. 2 is a flow chart of a method of establishing a selected IP traffic offload connection under an H(e)NB according to a second embodiment of the invention.

Referring to FIG. 2, there is illustrated a method for establishing a selected IP traffic offload connection in a scenario with a H(e)NB according to a second embodiment of the invention, and the following steps are further included before the step 1021 of the first embodiment.

The step 201 is to determine whether the H(e)NB is connected with the local gateway, and if so, then the flow proceeds to the step 1021; otherwise, the flow proceeds to the step 202.

The step 202 is to determine whether the APN requested by the UE allows a selected IP traffic offload connection to be established, and if so, to establish a selected IP traffic offload connection through a core network gateway; otherwise, to establish a normal packet data network connection through the core network gateway.

If the H(e)NB is in connection with the local gateway (L-GW), then an IP address is generated; otherwise, no IP address is generated. Thus the H(e)NB can determine from the presence or absence of an IP address whether it is in connection with the local gateway. If the H(e)NB is in connection with the local gateway, then the step 102 and the subsequent steps in the first embodiment can be performed. If there is no connection between the H(e)NB and the local gateway, then it is determined whether the APN requested by the UE allows a selected IP traffic offload connection to be established and a subsequent operation is performed according to a determination result: if the APN requested by the UE allows a selected IP traffic offload connection to be established, then a selected IP traffic offload connection through the core network gateway is established; otherwise, a normal packet data network connection through the core network gateway is established.

The foregoing method will be described below by way of an example.

Figure 3:
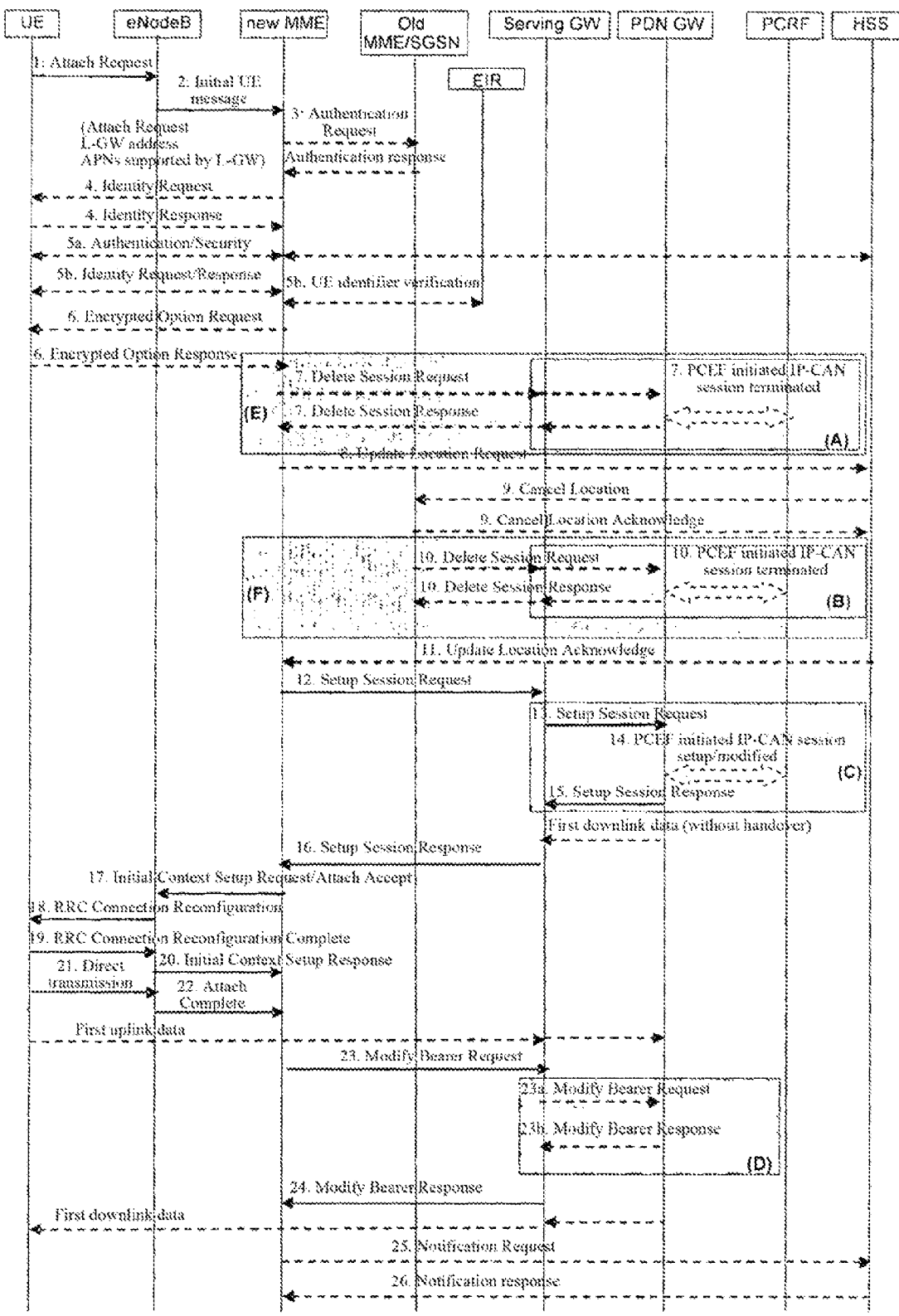
FIG. 3 is a structural diagram of the method of establishing a selected IP traffic offload connection under an H(e)NB according to a first application instance of the invention.

Referring to FIG. 3, there is illustrated as an example an Evolved-Universal Terrestrial Radio Access Network (E-UTRAN) Initial Attach procedure of an LTE system.

Firstly, a User Equipment (UE) initiates an Attach Request to an (enhanced) NodeB ((e)NB), and the (e)NB sends to a core network control node MME an Initial UE message including the Attach Request, the address of a Local Gateway (L-GW), and the access point names supported by the local gateway (i.e., L-GW's supported APNs).

The core network control node determines that an APN requested by the UE allows to establish a selected IP traffic offload connection but the APNs supported by the local gateway reported from the H(e)NB do not include the APN requested by the UE and the local gateway is incapable of being connected to the APN requested by the UE, and the core network control node reselects a Serving Gateway (S-GW) and a Packet data network Gateway (P-GW) and establishes a selected IP traffic offload connection through the serving gateway and the packet data network gateway.

In this process, if the core network control node is changed, then a new core network control node (a new MME) retrieves a UE context from the old core network control node (old MME) with the address of the old core network control node, and the old core network control node checks an Attach Request message. Moreover, the new core network control node notifies a home subscriber server of information of the location of the new core network control node of the UE, and the home subscriber server stores the address of the new core network control node and requests the old core network control node for deleting the UE context.

In the foregoing example, the H(e)NB sends the initial UE message to the core network control node by adding thereto the address of the local gateway and the names of the APNs supported by the local gateway, and thereafter the core network control node can firstly determine whether the APN requested by the UE allows a selected IP traffic offload connection to be established and then determine from the message whether the local gateway is capable of being connected to the APN requested by the UE before requesting for the connection. When the core network control node determines that the requested APN allows a selected IP traffic offload connection to be established but the local gateway is incapable of being connected to the requested APN, no selected IP traffic offload connection through the local gateway can be established. The determination process is performed before establishing the connection, so it is not necessary to return a message of a connection establishment failure, and the core network control node can reselect a serving gateway and a packet data network gateway and establish a selected IP traffic offload connection to thereby avoid a waste of a signalling resource arising from retrying a connection after the message is returned only upon connection failure as in the prior art.

Figure 4:
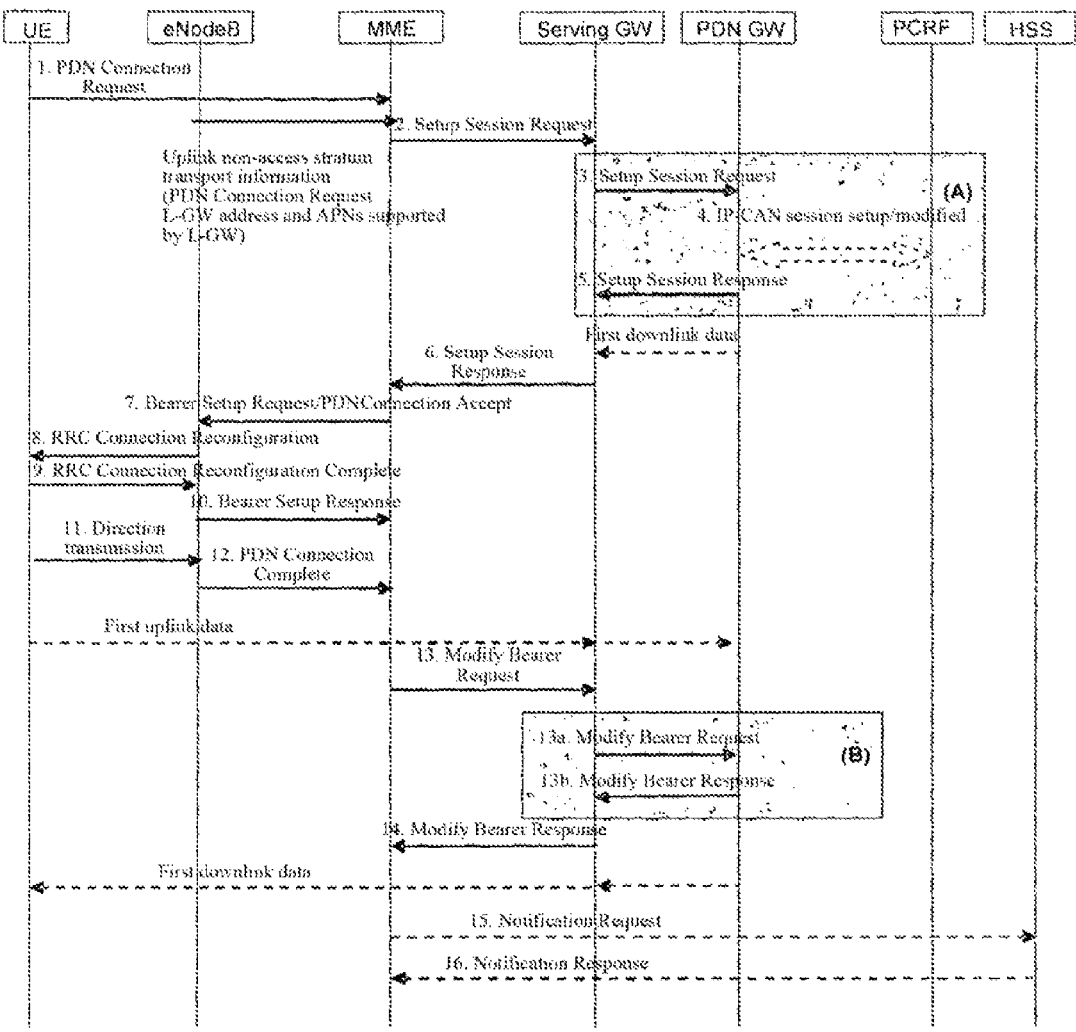
FIG. 4 is a structural diagram of the method of establishing a selected IP traffic offload connection under an H(e)NB according to a second application instance of the invention.

Referring to FIG. 4, another example will be given. Firstly, the H(e)NB adds the address of a local gateway and the access point names supported by the local gateway to an Uplink Non-Access Stratum (NAS) transport message and sends the message to a core network control node, and the core network control node firstly determines an APN requested by a UE allows a selected IP traffic offload connection to be established and the local gateway is capable of being connected to the APN requested by the UE, and then establishes a selected IP traffic offload connection for the UE through the local gateway.

As in the forgoing first example, the H(e)NB firstly sends the information of the local gateway and the APNs supported by the local gateway to the core network control node to enable the core network control node to determine whether the local gateway allows a selected IP traffic offload connection to be established before connecting to thereby avoid a waste of a signalling resource possibly arising from connecting without any determination.

Figure 5:
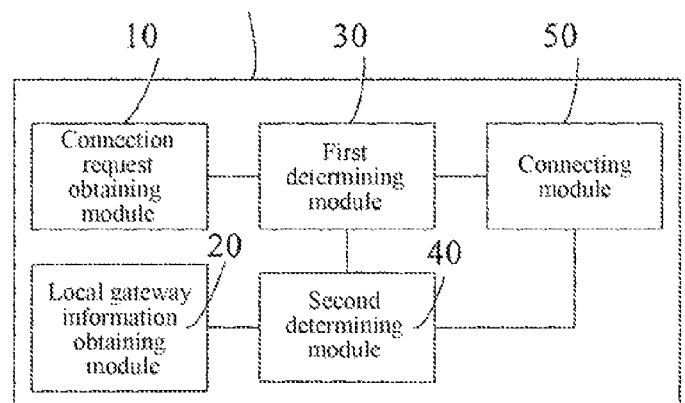
FIG. 5 is a schematic structural diagram of a device for establishing a selected IP traffic offload connection under an H(e)NB according to a first embodiment of the invention.

Referring to FIG. 5, there is illustrated a device 100 for establishing a selected IP traffic offload connection under a H(e)NB according to the first embodiment of the invention, which includes a connection request obtaining module 10, a local gateway information obtaining module 20, a first determining module 30, a second determining module 40 and a connecting module 50.

The connection request obtaining module 10 is configured to obtain a request initiated from a UE for a packet data network connection to an APN.

The local gateway information obtaining module 20 is configured to obtain an address of a local gateway in connection with the H(e)NB and information of APNs supported by the local gateway.

The first determining module 30 is configured to determine whether the requested APN allows a selected IP traffic offload connection to be established and to transport a determination result to the second determining module 40 and the connecting module 50.

The second determining module 40 is configured to determine whether the local gateway is capable of being connected to the requested APN; and to transport a determination result to the connecting module 50.

The connecting module 50 is configured to establish a selected IP traffic offload connection. The connecting module 50 determines from the determination results of the first determining module 30 and the second determining module 40 a scheme for establishing a selected IP traffic offload connection. If the determination result of the first determining module 30 is that the requested APN allows no selected IP traffic offload connection to be established, then the connecting module 50 establishes a packet data network connection through a core network gateway. If the determination result of the first determining module 30 is that the requested APN allows a selected IP traffic offload connection to be established and the determination result of the second determining module 40 is that the local gateway is capable of being connected to the requested APN, then the connecting module 50 establishes a selected IP traffic offload connection through the local gateway. If the determination result of the first determining module 30 is that the requested APN allows a selected IP traffic offload connection to be established and the determination result of the second determining module 40 is that the local gateway is incapable of being connected to the requested APN, then the connecting module 50 establishes a selected IP traffic offload connection through a serving gateway and a packet data network gateway.

Figure 6:
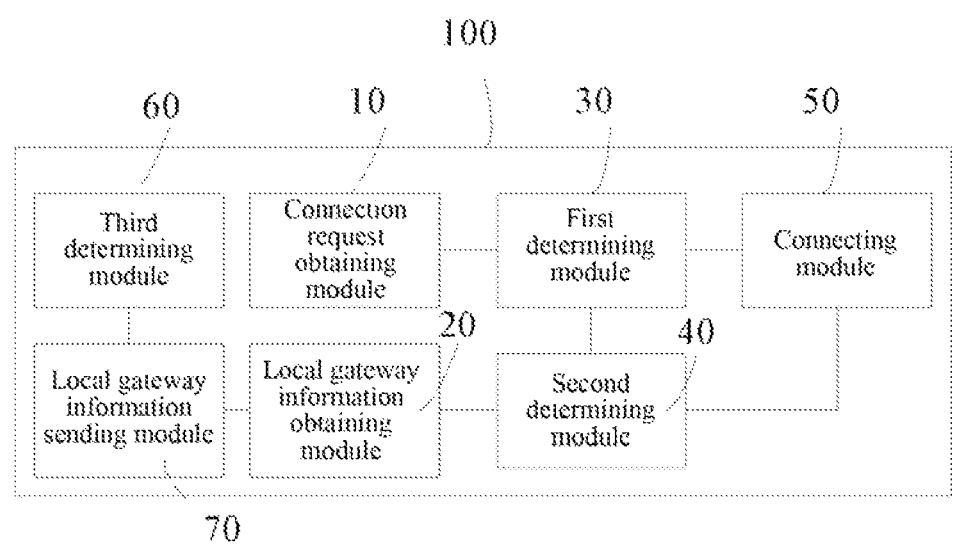
FIG. 6 is a schematic structural diagram of a device for establishing a selected IP traffic offload connection under an H(e)NB according to a second embodiment of the invention.

Referring to FIG. 6, the device 100 for establishing a selected IP traffic offload connection under a H(e)NB further includes a third determining module 60 and a local gateway information sending module 70. The third determining module 60 is configured to determine whether the H(e)NB is in an IP connection with the local gateway and to transport a determination result to the local gateway information sending module 70 which in turn sends the information of the local gateway to the local gateway information obtaining module 20.

The respective embodiments in the specification have been described progressively so that each of the embodiments has laid emphasis on its difference(s) from the other embodiments and reference can be made to the description of each other for their commonalities. The embodiment of the device has been described briefly in view of its substantial similarity to the embodiment of the method, and reference can be made to the description of the embodiment of the method for their relevancies.

The method of and device for establishing a selected IP traffic offload connection in a scenario with a H(e)NB have been introduced above in details, the principle of the invention and the implementations thereof have been set forth in this context by way of specific examples, and the foregoing description of the embodiments are merely intended to facilitate understanding of the method of the invention and the essential idea thereof; and also those ordinarily skilled in the art can modify the particular implementations and the application scopes thereof in light of the idea of the invention. In summary, the disclosure of this specification shall not be construed as limiting the invention.

Those skilled in the art shall appreciate that the embodiments of the invention can be embodied as a method, a system or a computer program product. Therefore, the invention can be embodied in the form of an ail-hardware embodiment, an all-software embodiment or an embodiment of software and hardware in combination. Furthermore, the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore, the appended claims are intended to be construed as encompassing the preferred embodiments and all the modifications and variations coming into the scope of the invention, Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

The invention claimed is:

1. A method for establishing a selected IP traffic offload connection under a H(e)NB, comprising:
   obtaining a request for a packet data network connection to an access point name (APN);
   obtaining an address of a local gateway in connection with the H(e)NB and information of APNs supported by the local gateway;
   determining whether the requested APN allows a selected IP traffic offload connection to be established;
   determining whether the local gateway is capable of being connected to the requested APN; and
   determining from determination results a scheme for establishing a selected IP traffic offload connection, and establishing a selected IP traffic offload connection;
   wherein before obtaining an address of a local gateway in connection with the H(e)NB and information of APNs supported by the local gateway, the method further comprises: selecting a local gateway with an address and information of APNs supported by the local gateway to be reported;
   wherein determining whether the APN allows a selected IP traffic offload connection to be established comprises:
   determining from obtained external subscription information and obtained local configuration information whether the APN requested by a UE allows a selected IP traffic offload connection to be established.

2. The method according to claim 1, wherein selecting the local gateway to be reported comprises:
   if there are a plurality of local gateways in connection with the H(e)NB, then selecting one of the local gateways and reporting the address of this local gateway and information of APNs supported by this local gateway.

3. The method according to claim 1, wherein selecting the local gateway to be reported comprises:
   if there are a plurality of local gateways in connection with the H(e)NB, then selecting and reporting addresses of these local gateways and information of APNs supported by these respective local gateways.

4. The method according to claim 1, wherein determining whether the APN requested by a UE allows a selected IP traffic offload connection to be established comprises:
   if both of flag bits in the subscription information and the local configuration information to indicate whether to allow the connection to be established are "1", then indicating that the APN allows a selected IP traffic offload connection to be established; or if at least one of the flag bits is "0", then indicating that the APN allows no selected IP traffic offload connection to be established.

5. The method according to claim 1, wherein determining whether the local gateway is capable of being connected to the APN comprises:
   determining whether the local gateway is capable of being connected to the APN requested by a UE according to the obtained address of the local gateway and information of the APNs supported by the local gateway.

6. The method according to claim 5, wherein determining whether the local gateway is capable of being connected to the APN requested by a UE comprises:
   if the information of the APNs supported by the local gateway reported from the H(e)NB comprises the APN requested by the UE, then indicating that the local gateway is capable of being connected to the APN requested by the UE; otherwise, indicating that the local gateway is incapable of being connected to the APN requested by the UE.

7. The method according to claim 1, wherein before selecting a local gateway with an address and information of APNs supported by the local gateway to be reported, the method further comprises:
   determining whether the H(e)NB is connected with the local gateway, and if so, then selecting the local gateway with the address and information of APNs supported by the local gateway to be reported; otherwise, performing the step of:
   determining whether the APN requested by a UE allows a selected IP traffic offload connection to be established, and if so, then establishing a selected IP traffic offload connection through a core network gateway; otherwise, establishing a normal packet data network connection through the core network gateway.

8. The method according to claim 7, wherein determining whether the H(e)NB is connected with the local gateway comprises: determining whether there is an IP address generated between the H(e)NB and the local gateway, and if so, then indicating that there is a connection between the H(e)NB and the local gateway; otherwise, indicating that there is no connection between the H(e)NB and the local gateway.

9. A device for establishing a selected IP traffic offload connection under a H(e)NB, comprising:
   a processor;
   a non-transitory computer readable storage medium with an executable program stored thereon, wherein the program instructs the processor to perform operations comprising:
   obtaining a request for a packet data network connection to an access point name (APN);

obtaining an address of a local gateway in connection with the H(e)NB and information of APNs supported by the local gateway;
determining whether the requested APN allows a selected IP traffic offload connection to be established;
determining whether the local gateway is capable of being connected to the requested APN; and
determining from determination results a scheme for establishing a selected IP traffic offload connection, and establishing a selected IP traffic offload connection;
wherein before obtaining an address of a local gateway in connection with the H(e)NB and information of APNs supported by the local gateway, the program instructs the processor to further perform: selecting a local gateway with an address and information of APNs supported by the local gateway to be reported;
wherein determining whether the APN allows a selected IP traffic offload connection to be established comprises:
determining from obtained external subscription information and obtained local configuration information whether the APN requested by a UE allows a selected IP traffic offload connection to be established.

10. The device according to claim 9, wherein selecting the local gateway to be reported comprises:
if there are a plurality of local gateways in connection with the H(e)NB, then selecting one of the local gateways and reporting the address of this local gateway and information of APNs supported by this local gateway.

11. The device according to claim 9, wherein selecting the local gateway to be reported comprises:
if there are a plurality of local gateways in connection with the H(e)NB, then selecting and reporting addresses of these local gateways and information of APNs supported by these respective local gateways.

12. The device according to claim 9, wherein determining whether the APN requested by a UE allows a selected IP traffic offload connection to be established comprises:
if both of flag bits in the subscription information and the local configuration information to indicate whether to allow the connection to be established are "1", then indicating that the APN allows a selected IP traffic offload connection to be established; or if at least one of the flag bits is "0", then indicating that the APN allows no selected IP traffic offload connection to be established.

13. The device according to claim 9, wherein determining whether the local gateway is capable of being connected to the APN comprises:
determining whether the local gateway is capable of being connected to the APN requested by a UE according to the obtained address of the local gateway and information of the APNs supported by the local gateway.

14. The device according to claim 13, wherein determining whether the local gateway is capable of being connected to the APN requested by a UE comprises:
if the information of the APNs supported by the local gateway reported from the H(e)NB comprises the APN requested by the UE, then indicating that the local gateway is capable of being connected to the APN requested by the UE; otherwise, indicating that the local gateway is incapable of being connected to the APN requested by the UE.

15. The device according to claim 9, wherein before selecting a local gateway with an address and information of APNs supported by the local gateway to be reported, the program instructs the processor to further perform:
determining whether the H(e)NB is connected with the local gateway, and if so, then selecting the local gateway with the address and information of APNs supported by the local gateway to be reported; otherwise,
determining whether the APN requested by a UE allows a selected IP traffic offload connection to be established, and if so, then establishing a selected IP traffic offload connection through a core network gateway; otherwise, establishing a normal packet data network connection through the core network gateway.

16. The device according to claim 15, wherein determining whether the H(e)NB is connected with the local gateway comprises: determining whether there is an IP address generated between the H(e)NB and the local gateway, and if so, then indicating that there is a connection between the H(e)NB and the local gateway; otherwise, indicating that there is no connection between the H(e)NB and the local gateway.

* * * * *